(12) United States Patent
Wu

(10) Patent No.: US 11,842,201 B2
(45) Date of Patent: Dec. 12, 2023

(54) PORTABLE ELECTRONIC DEVICE CAPABLE OF RESETTING SYSTEM

(71) Applicant: PEGATRON CORPORATION, Taipei (TW)

(72) Inventor: Chi Yu Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 272 days.

(21) Appl. No.: 17/370,945

(22) Filed: Jul. 8, 2021

(65) Prior Publication Data

US 2022/0058027 A1 Feb. 24, 2022

(30) Foreign Application Priority Data

Aug. 24, 2020 (TW) .................................. 109128794

(51) Int. Cl.
| | |
|---|---|
| *G06F 9/4401* | (2018.01) |
| *G06F 1/14* | (2006.01) |
| *G06F 1/28* | (2006.01) |
| *G06F 1/16* | (2006.01) |

(52) U.S. Cl.
CPC .............. *G06F 9/4401* (2013.01); *G06F 1/14* (2013.01); *G06F 1/1613* (2013.01); *G06F 1/28* (2013.01)

(58) Field of Classification Search
CPC ..... G06F 1/24; G06F 1/28; G06F 1/26; G06F 1/1613; G06F 1/4401
See application file for complete search history.

(56) References Cited

U.S. PATENT DOCUMENTS

| | | | | |
|---|---|---|---|---|
| 5,781,744 A | * | 7/1998 | Johnson | G06F 13/4081 710/15 |
| 2003/0149867 A1 | * | 8/2003 | Park | G06F 1/24 713/1 |
| 2008/0070617 A1 | * | 3/2008 | Ban | H04M 1/725 455/550.1 |
| 2012/0235715 A1 | * | 9/2012 | Lee | H03K 17/22 327/142 |

(Continued)

FOREIGN PATENT DOCUMENTS

| | | |
|---|---|---|
| CN | 110262647 | 9/2019 |
| TW | I231916 | 5/2005 |

*Primary Examiner* — Raymond N Phan
(74) *Attorney, Agent, or Firm* — J.C. PATENTS

(57) ABSTRACT

A portable electronic device includes a main system circuit, a storage, a power button, a power-off trigger circuit, a system power-off circuit, a power supply circuit, and a configuration power-off circuit. The power-off trigger circuit is coupled to the power button and provides a system power-off signal and a configuration power-off signal when the power button is detected to be continuously pressed and a pressing time is greater than a predetermined time. The system power-off circuit is coupled to the power-off trigger circuit and the power supply circuit and stops providing the main system circuit with a system power supply voltage provided by the power supply voltage according to the system power-off signal. The configuration power-off circuit is coupled to the power-off trigger circuit and the storage and drives the configuration power supply voltage provided to the storage down to a ground voltage according to the configuration power-off signal.

12 Claims, 2 Drawing Sheets

(56) References Cited

U.S. PATENT DOCUMENTS

| | | | |
|---|---|---|---|
| 2012/0265974 A1* | 10/2012 | Shen | G06F 1/24 |
| | | | 713/1 |
| 2016/0350015 A1* | 12/2016 | Luo | G06F 12/0246 |
| 2017/0235351 A1* | 8/2017 | Zhou | G06F 1/263 |
| | | | 713/300 |
| 2019/0179707 A1* | 6/2019 | Sharkey | G06F 11/0742 |

* cited by examiner

PORTABLE ELECTRONIC DEVICE CAPABLE OF RESETTING SYSTEM

CROSS-REFERENCE TO RELATED APPLICATION

This application claims the priority benefit of Taiwan application serial no. 109128794, filed on Aug. 24, 2020. The entirety of the above-mentioned patent application is hereby incorporated by reference herein and made a part of this specification.

BACKGROUND

Technical Field

The disclosure relates to an electronic device, and more particularly, to a portable electronic device.

Description of Related Art

To take into account both portability and stability, portable electronic devices usually come with a design of being difficult to disassemble. Generally speaking, when the system crashes or fails to boot, the entire casing must be disassembled to deactivate the circuit operation. For example, the battery on the printed circuit board is unplugged and then is reassembled back. Furthermore, when an embedded controller (EC) crashes, in addition to disassembling the casing, unplugging the system battery, and re-powering the EC (resetting the system), the real time clock button battery is further required to be removed or reset. In other words, when a serious problem (e.g., the computer crashes, the embedded controller runs into an infinite loop, etc.) happens to a portable electronic device, it is usually difficult for frontline customer service personnel or end users to tackle the problem by themselves, and the portable electronic device have to be sent for the maintenance, resulting in inevitable maintenance costs.

SUMMARY

The disclosure provides a portable electronic device capable of completely resetting the system without opening the casing.

In the disclosure, the portable electronic device includes a main system circuit, a storage, a power button, a power-off trigger circuit, a system power-off circuit, a power supply circuit, and a configuration power-off circuit. The storage is coupled to the main system circuit. The power button is coupled to the main system circuit. The power-off trigger circuit is coupled to the power button, and provides a system power-off signal and a configuration power-off signal when the power button is detected to be continuously pressed and a pressing time is greater than a predetermined time. The system power-off circuit is coupled to the power-off trigger circuit. The power supply circuit is coupled to the system power-off circuit and adapted to provide the system power-off circuit with a system power voltage, and the system power-off circuit stops providing the main system circuit with the system power voltage according to the system power-off signal from the power-off trigger circuit. A configuration power-off circuit is coupled to the power-off trigger circuit and the storage, and driving a configuration power voltage provided to the storage down to a ground voltage according to the configuration power-off signal from the power-off trigger circuit.

Based on the above, the portable electronic device of the embodiments in the disclosure forms a hardware system (i.e., the power-off trigger circuit, the system power-off circuit, and the power supply circuit) capable of controlling the power off outside the main system circuit. When an abnormality (e.g. the system crashes or cannot power on) happens to the portable electronic device, the power-off procedure may be triggered by continuously pressing the power button to completely disconnect the main system circuit and the storage through the system power-off circuit and the power supply circuit. Accordingly, the controller and system configuration in the main system circuit may be reset through the power button without opening the casing, and the time and the money cost for the maintenance are reduced.

In order to make the aforementioned features and advantages of the disclosure comprehensible, embodiments accompanied with drawings are described in detail below.

DESCRIPTION OF THE EMBODIMENTS

Figure 1:
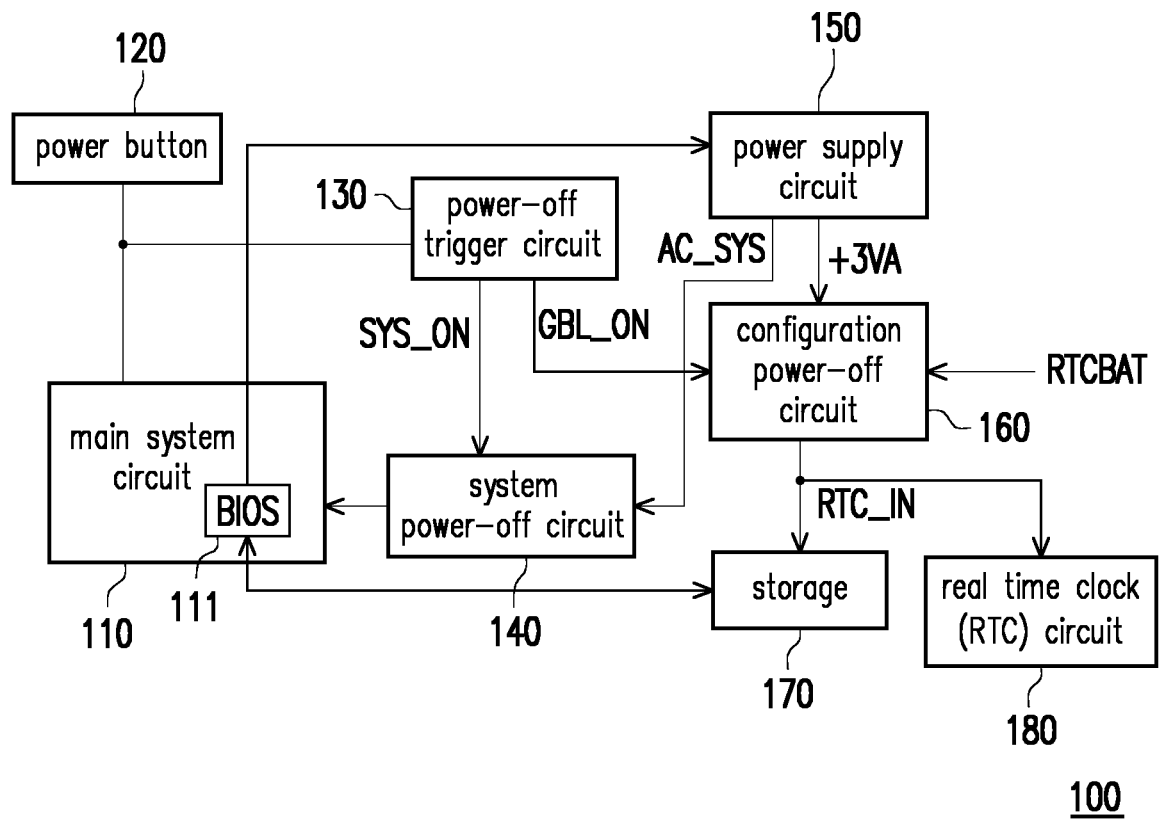
FIG. 1 is a schematic view of a system of a portable electronic device according to an embodiment of the disclosure.

FIG. 1 is a schematic view of a system of a portable electronic device according to an embodiment of the disclosure. Referring to FIG. 1, in the embodiment, a portable electronic device 100 includes a main system circuit 110, a power button 120, a power-off trigger circuit 130, a system power-off circuit 140, a power supply circuit 150, a configuration power-off circuit 160, a storage 170, and a real time clock (RTC) circuit 180. The main system circuit 110 is coupled to the power button 120, the system power-off circuit 140, the power supply circuit 150, and the storage 170. The power-off trigger circuit 130 is coupled to the power button 120, the system power-off circuit 140, and the configuration power-off circuit 160. The system power-off circuit 140 is coupled to the power supply circuit 150. The configuration power-off circuit 160 is coupled to the power supply circuit 150, the storage 170, and the RTC circuit 180.

In the embodiment, the power-off trigger circuit 130 is adapted to detect whether the power button 120 is continuously pressed. When the power-off trigger circuit 130 detects that the power button 120 has been continuously pressed and the pressing time is greater than the predetermined time (e.g., greater than 1 second), an enabled system power-off signal SYS_ON and an enabled configuration power-off signal GBL_ON are provided. The enabling time of the system power-off signal SYS_ON and the configuration power-off signal GBL_ON is greater than 1 second, and then the system power-off signal SYS_ON and the configuration power-off signal GBL_ON are disabled.

The system power-off circuit 140 is adapted to receive a system power voltage AC_SYS and provide the main system circuit 110 with the system power voltage AC_SYS. The system power-off circuit 140 is further adapted to receive the system power-off signal SYS_ON. When receiving the system power-off signal SYS_ON from the power-off trigger circuit 130, the system power-off circuit 140 stops providing the main system circuit 110 with the system power voltage AC_SYS according to (or in response to) the system power-off signal SYS_ON. When the provision of the system power-off signal SYS_ON stops (returns to a disabled state), in response to the disabled system power-off signal SYS_ON, the system power-off circuit 140 provides the main system circuit 110 with the system power voltage AC_SYS again.

The configuration power-off circuit 160 is adapted to receive a power supply voltage +3 VA and a battery voltage RTCBAT from the power supply circuit 150 and accordingly provide the storage 170 and the RTC circuit 180 with a configuration power voltage RTC_IN. The original level of the configuration power voltage RTC_IN is related to at least one of the power supply voltage +3 VA and the battery voltage RTCBAT. The configuration power-off circuit 160 is further adapted to receive the configuration power-off signal GBL_ON from the power-off trigger circuit 130. When the configuration power-off circuit 160 receives the configuration power-off signal GBL_ON (i.e., the configuration power-off signal GBL_ON is enabled), the configuration power-off circuit 160 drives the configuration power voltage RTC_IN down to the ground voltage according to (or in response to) the configuration power-off signal GBL_ON. When the provision of the configuration power-off signal GBL_ON stops (i.e., when the configuration power-off signal GBL_ON returns to a disabled state), the configuration power-off circuit 160 in response to the disabled configuration power-off signal GBL_ON drives the configuration power voltage RTC_IN back to the original level again.

In the embodiment of the disclosure, the storage 170 is adapted to store configuration data of the portable electronic device 100, and the storage 170 includes a non-volatile memory, but the embodiment of the disclosure is not limited thereto. In addition, the RTC circuit 180 is adapted to count a current time.

Based on the above, the portable electronic device 100 forms a hardware system (i.e., the power-off trigger circuit 130, the system power-off circuit 140, and the configuration power-off circuit 160) capable of controlling the power off outside the main system circuit. When an abnormality (e.g. the system crashes or cannot power on) happens to the portable electronic device 100, the power-off procedure may be triggered by continuously pressing the power button 120 to completely disconnect the main system circuit 110 and the storage 170 through the system power-off circuit 140 and the configuration power-off circuit 160. Accordingly, without opening the casing, the controller and the system configuration in the main system circuit 110 can be reset through the power button 120, and the time and the money cost for the maintenance are reduced.

In the embodiment of the disclosure, the main system circuit 110 includes a basic input/output system (BIOS) 111. The BIOS 111 of the main system circuit 110 is coupled to the power button 120, the power supply circuit 150, and the storage 170. Moreover, when the power button 120 is detected to be instantaneously pressed, the BIOS 111 enables the power supply circuit 150 to start to provide the system power voltage AC_SYS, and reads the configuration data of the storage 170 to perform the initialization of the portable electronic device 100. The provision of the power supply voltage +3 VA may be started and continue in operation after the power supply circuit 150 is enabled.

Figure 2:
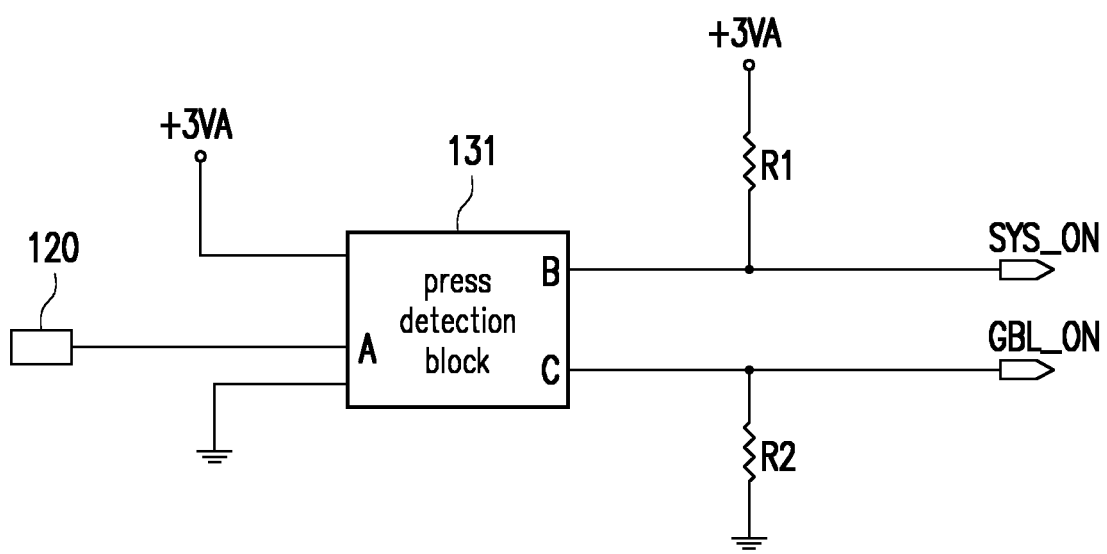
FIG. 2 is a schematic circuit view of a power-off trigger circuit according to an embodiment of the disclosure.

FIG. 2 is a schematic circuit view of a power-off trigger circuit according to an embodiment of the disclosure. Referring to FIG. 1 and FIG. 2, in the embodiment, the power-off trigger circuit 130 includes a press detection block 131, a first resistor R1 and a second resistor R2.

The press detection block 131 includes an input terminal A coupled to the power button 120, a first output terminal B and a second output terminal C. When the press detection block 131 detects the power button 120 being continuously pressed and the pressing time is greater than the predetermined time, the system power-off signal SYS_ON is provided at the first output terminal B, and the configuration power-off signal GBL_ON is provided at the second output terminal C. The first resistor R1 is coupled between the power supply voltage +3 VA and the first output terminal B. The second resistor R2 is coupled between the second output terminal C and the ground voltage.

In the embodiment, the press detection block 131 may be implemented by a programmable integrated circuit.

Figure 3:
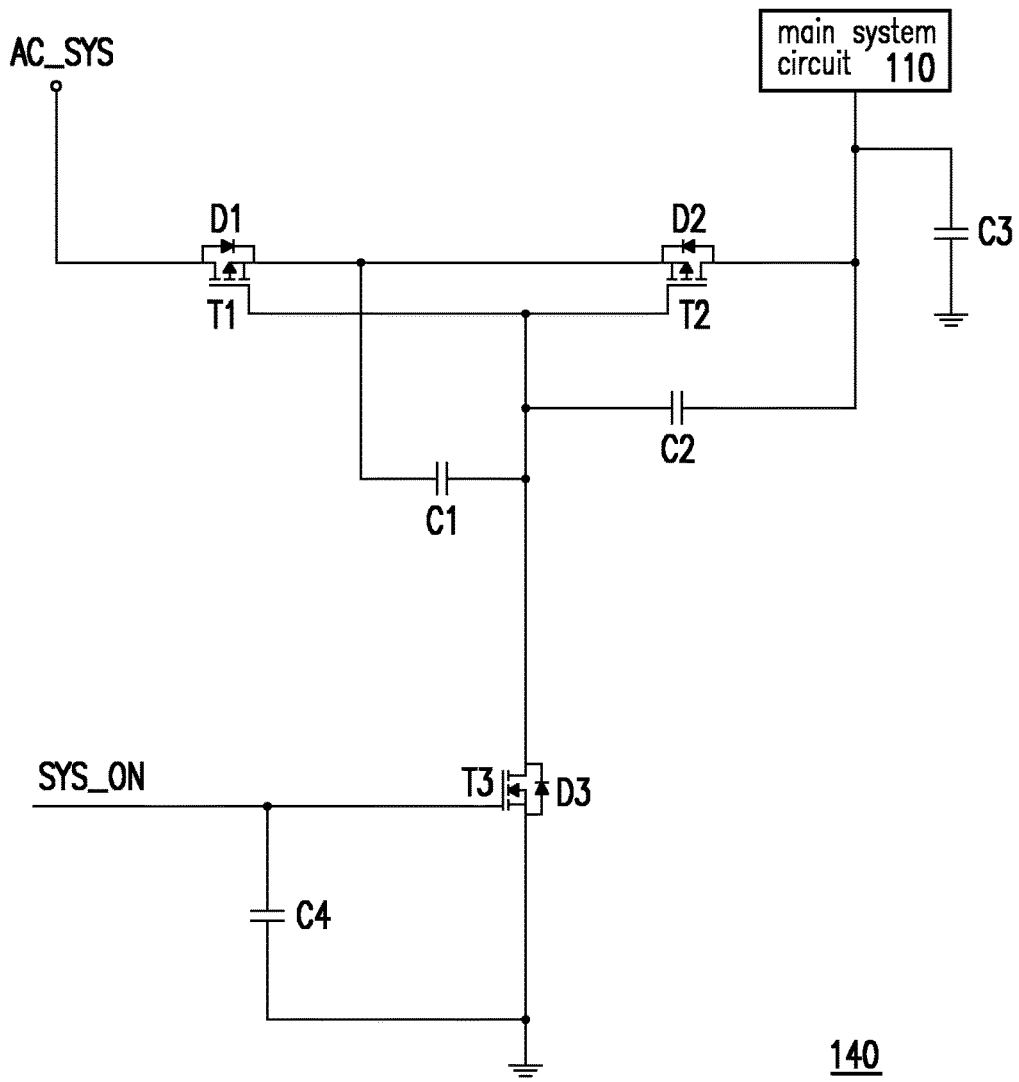
FIG. 3 is a schematic circuit view of a system power-off circuit according to an embodiment of the disclosure.

FIG. 3 is a schematic circuit view of a system power-off circuit according to an embodiment of the disclosure. Referring to FIG. 1 and FIG. 3, in the embodiment, the system power-off circuit 140 includes a first transistor T1, a second transistor T2, a third transistor T3, a first diode D1, a second diode D2, a third diode D3, a first capacitor C1, a second capacitor C2, a third capacitor C3 and a fourth capacitor C4.

The first transistor T1 includes a drain terminal, a control terminal and a source terminal. The drain terminal of the first transistor T1 receives the system power voltage AC_SYS. The first diode D1 is forwardly coupled between the drain terminal and the source terminal of the first transistor T1. The second transistor T2 includes a drain terminal, a control terminal and a source terminal. The drain terminal of the second transistor T2 is coupled to the main system circuit 110, the control terminal of the second transistor T2 is coupled to the control terminal of the first transistor T1, and the source terminal of the second transistor T2 is coupled to the source terminal of the first transistor T1. The second diode D2 is forwardly coupled between the drain terminal and the source terminal of the second transistor T2.

The third transistor T3 includes a drain terminal, a control terminal and a source terminal, the drain terminal of the third transistor T3 is coupled to the control terminal of the first transistor T1, the control terminal of the third transistor T3 receives the system power-off signal SYS_ON, and the source terminal of the third transistor T3 receives the ground voltage. The third diode D3 is forwardly coupled between the source terminal and the drain terminal of the third transistor T3. The first capacitor C1 is coupled between the source terminal of the first transistor T1 and the control terminal of the first transistor T1. The second capacitor C2 is coupled to the control terminal of the second transistor T2 and the drain terminal of the second transistor T2. The third capacitor C3 is coupled between the drain terminal of the second transistor T2 and the ground voltage. The fourth capacitor C4 is coupled between the control terminal of the third transistor T3 and the ground voltage.

In the embodiment of the disclosure, the first diode D1, the second diode D2 and the third diode D3 are the parasitic diodes of the first transistor T1, the second transistor T2, and the third transistor T3, respectively. However, the embodiments of the disclosure are not limited thereto.

Figure 4:
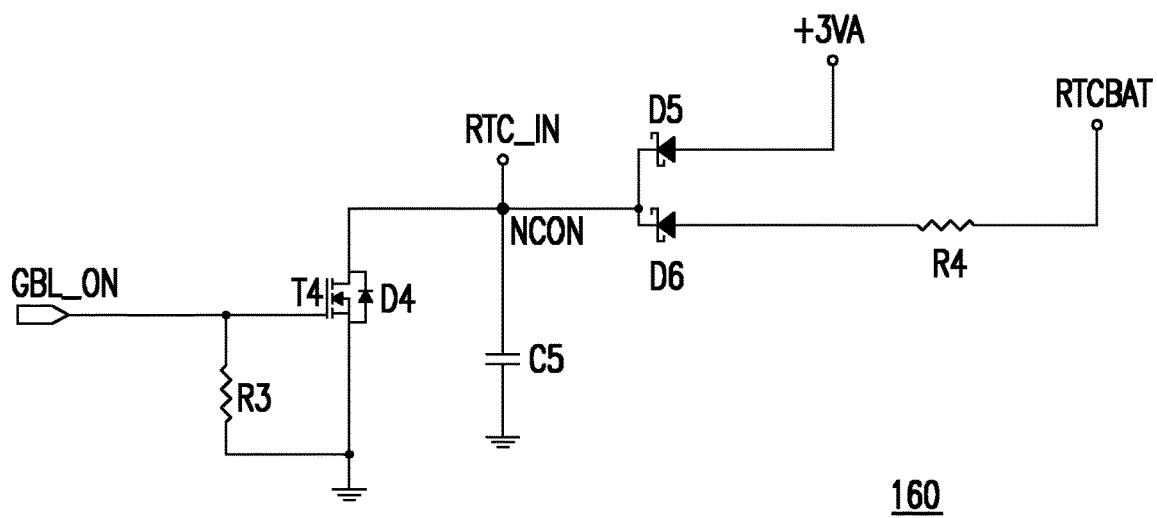
FIG. 4 is a schematic circuit view of a configuration power-off circuit according to an embodiment of the disclosure.

FIG. 4 is a schematic circuit view of a configuration power-off circuit according to an embodiment of the disclosure. Referring to FIG. 1 and FIG. 4, in the embodiment, the configuration power-off circuit 160 includes a configuration power node NCON, a fourth transistor T4, a fourth diode D4, a fifth diode D5, a sixth diode D6, a third resistor R3, a fourth resistor R4 and a fifth capacitor C5.

The configuration power node NCON is coupled to the storage 170 to provide the configuration power voltage RTC_IN. The fourth transistor T4 includes a drain terminal, a control terminal and a source terminal. The drain terminal of the fourth transistor T4 is coupled to the configuration power node NCON, the control terminal of the fourth transistor T4 receives the configuration power-off signal GBL_ON, and the source terminal of the fourth transistor T4 receives the ground voltage. The fourth diode D4 is forwardly coupled between the source terminal and the drain terminal of the fourth transistor T4. The third resistor R3 is coupled between the control terminal of the fourth transistor T4 and the ground voltage.

The fifth diode D5 includes an anode and a cathode. The anode of the fifth diode D5 receives the power supply voltage +3 VA, and the cathode of the fifth diode D5 is coupled to the configuration power node NCON. The fourth resistor R4 includes a first terminal and a second terminal, and the first terminal of the fourth resistor R4 receives the battery voltage RTCBAT. The sixth diode D6 includes an anode and a cathode. The anode of the sixth diode D6 is coupled to the second terminal of the fourth resistor R4, and the cathode of the sixth diode D6 is coupled to the configuration power node NCON. The fifth capacitor C5 is coupled between the configuration power node NCON and the ground voltage.

In the embodiment of the disclosure, the fourth diode D4 is a parasitic diode of the fourth transistor T4, and the fifth diode D5 and the sixth diode D6 are each a Schottky diode.

Based on the above, the portable electronic device of the embodiments in the disclosure forms a hardware system (i.e., the power-off trigger circuit, the system power-off circuit, and the power supply circuit) capable of controlling the power off outside the main system circuit. When an abnormality (e.g. the system crashes or cannot power on) happens to the portable electronic device, the power-off procedure may be triggered by continuously pressing the power button to completely disconnect the main system circuit and the storage through the system power-off circuit and the power supply circuit. Accordingly, the controller and the system configuration in the main system circuit may be reset through the power button without opening the casing, and the time and the money cost for the maintenance are reduced.

Although the disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and their equivalents and not by the above detailed descriptions.

What is claimed is:

1. A portable electronic device comprising:
   a main system circuit;
   a storage coupled to the main system circuit;
   a power button coupled to the main system circuit;
   a power-off trigger circuit coupled to the power button, and providing a system power-off signal and a configuration power-off signal when the power button is detected to be continuously pressed and a pressing time is greater than a predetermined time;
   a system power-off circuit coupled to the power-off trigger circuit;
   a power supply circuit coupled to the system power-off circuit and adapted to provide the system power-off circuit with a system power voltage, wherein the system power-off circuit receives the system power voltage and provides the system power voltage to the main system circuit, and the system power-off circuit stops providing the main system circuit with the system power voltage according to the system power-off signal from the power-off trigger circuit; and
   a configuration power-off circuit coupled to the power-off trigger circuit and the storage, and driving a configuration power voltage provided to the storage down to a ground voltage according to the configuration power-off signal from the power-off trigger circuit.

2. The portable electronic device according to claim 1, wherein the main system circuit comprises a basic input/output system (BIOS), wherein the BIOS is coupled to the power button and the storage, and enables the power supply circuit and reads the storage to perform an initialization of the portable electronic device when the power button is detected to be pressed instantaneously.

3. The portable electronic device according to claim 1, wherein an enabling time of the system power-off signal and an enabling time of the configuration power-off signal are greater than 1 second.

4. The portable electronic device according to claim 1, wherein the system power-off circuit comprises:
   a first transistor comprising a drain terminal, a control terminal and a source terminal, wherein the drain terminal of the first transistor receives the system power voltage;
   a first diode forwardly coupled between the drain terminal and the source terminal of the first transistor;
   a second transistor comprising a drain terminal, a control terminal and a source terminal, wherein the drain terminal of the second transistor is coupled to the main system circuit, the control terminal of the second transistor is coupled to the control terminal of the first transistor, and the source terminal of the second transistor is coupled to the source terminal of the first transistor;
   a second diode forwardly coupled between the drain terminal and the source terminal of the second transistor;
   a third transistor comprising a drain terminal, a control terminal and a source terminal, wherein the drain terminal of the third transistor is coupled to the control terminal of the first transistor, the control terminal of the third transistor receives the system power-off signal, and the source terminal of the third transistor receives the ground voltage;
   a third diode forwardly coupled between the source terminal and the drain terminal of the third transistor;
   a first capacitor coupled between the source terminal and the control terminal of the first transistor;
   a second capacitor coupled between the control terminal and the drain terminal of the second transistor;
   a third capacitor coupled between the drain terminal of the second transistor and the ground voltage; and
   a fourth capacitor coupled between the control terminal of the third transistor and the ground voltage.

5. The portable electronic device according to claim 1, wherein the configuration power-off circuit comprises:
   a configuration power node coupled to the storage to provide the configuration power voltage;
   a fourth transistor comprising a drain terminal, a control terminal and a source terminal, wherein the drain terminal of the fourth transistor is coupled to the configuration power node, the control terminal of the fourth transistor receives the configuration power-off signal, and the source terminal of the fourth transistor receives the ground voltage;
a fourth diode forwardly coupled between the source terminal and the drain terminal of the fourth transistor;
a third resistor coupled between the control terminal of the fourth transistor and the ground voltage;
a fifth diode comprising an anode and a cathode, wherein the anode receives a power supply voltage, and the cathode is coupled to the configuration power node;
a fourth resistor comprising a first terminal and a second terminal, wherein the first terminal of the fourth resistor receives a battery voltage;
a sixth diode comprising an anode and a cathode, wherein the anode of the sixth diode is coupled to the second terminal of the fourth resistor, and the cathode of the sixth diode is coupled to the configuration power node; and
a fifth capacitor coupled between the configuration power node and the ground voltage.

6. The portable electronic device according to claim 1, wherein the storage comprises a non-volatile memory.

7. The portable electronic device according to claim 1, wherein the configuration power voltage is further provided to a real time clock (RTC) circuit adapted to count a current time.

8. The portable electronic device according to claim 1, wherein the predetermined time is greater than 1 second.

9. The portable electronic device according to claim 3, wherein the power-off trigger circuit comprises:
a press detection block comprising an input terminal, a first output terminal, and a second output terminal, wherein the input terminal is coupled to the power button, and when the power button is detected to be continuously pressed by the press detection block and the pressing time is greater than the predetermined time, the press detection block provides the system power-off signal at the first output terminal and provides the configuration power-off signal at the second output terminal;
a first resistor coupled between a power supply voltage and the first output terminal; and
a second resistor coupled between the second output terminal and the ground voltage.

10. The portable electronic device according to claim 4, wherein the first diode, the second diode, and the third diode are each a parasitic diode.

11. The portable electronic device according to claim 5, wherein the fourth diode is a parasitic diode, and the fifth diode and the sixth diode are each a Schottky diode.

12. The portable electronic device according to claim 9, wherein the press detection block is implemented by a programmable integrated circuit.

* * * * *